United States Patent [19]

Todeschini

[11] 4,169,443

[45] Oct. 2, 1979

[54] CONTROL DEVICES

[75] Inventor: Eugenio Todeschini, Latina, Italy

[73] Assignee: Massey-Ferguson Service, N.V., Curacao, Netherlands

[21] Appl. No.: 842,423

[22] Filed: Oct. 14, 1977

[30] Foreign Application Priority Data

Oct. 14, 1976 [GB] United Kingdom ............... 42634/76

[51] Int. Cl.² .................... F02M 39/00; G05G 9/02
[52] U.S. Cl. ......................... 123/139 R; 74/471 XY; 123/98; 123/139 AZ
[58] Field of Search ............. 123/98, 139 R, 139 AC, 123/139 AZ, 140 R; 74/471 R, 471 XY, 473 R; 192/3 S

[56] References Cited

U.S. PATENT DOCUMENTS

| | | | |
|---|---|---|---|
| 1,552,135 | 9/1925 | Frink | 192/3 S |
| 1,788,899 | 1/1931 | Tenney | 74/473 R |
| 2,792,092 | 5/1957 | Fong | 192/3 S |
| 3,741,031 | 6/1973 | Schwerdtfeger | 74/471 XY |
| 3,916,719 | 11/1975 | Zwerenz | 192/3 S |
| 3,938,488 | 2/1976 | Aoki | 123/140 R |

Primary Examiner—Allan D. Herrmann
Attorney, Agent, or Firm—William R. Nolte

[57] ABSTRACT

A prime mover assembly comprising a prime mover and a control therefor, said control having a lever movable in a first plane to vary the rotational speed of said prime mover and movable in a second plane to stop said prime mover.

3 Claims, 4 Drawing Figures

CONTROL DEVICES

BACKGROUND OF THE INVENTION

This invention relates to controlling prime movers and in particular to controlling internal combustion engines fitted to vehicles.

It is usual to provide a control for a prime mover which regulates its rotational speed. It is also usual to provide a control which stops the prime mover. Where such arrangements are fitted to vehicles having a plurality of auxiliary services, such as a crawler vehicle, then the multiplicity of controls can be confusing to the operator and may even be dangerous.

It is an object of the present invention to obviate or mitigate the above disadvantages.

SUMMARY OF THE INVENTION

According to the present invention, there is provided a prime mover assembly comprising a prime mover and a control therefor, said control having a lever movable in a first plane to vary the rotational speed of said prime mover and movable in a second plane to stop said prime mover.

Preferably guide means are provided to guide said lever in said first plane and to permit movement in said second plane only when said lever is in a position corresponding to a minimum rotational speed.

The invention is particularly applicable to an assembly in which said prime mover is a diesel engine having a fuel pump provided with a speed control and a stop control, said lever being connected with said speed and stop controls by separate linkages so that movement of said lever in one of said planes operates said speed control and movement in the other of said planes operates the stop control.

Preferably said lever is mounted on a pivotable block for pivotting relative thereto about a first axis in one of said planes and the pivotable block is pivoted in a base block for pivotting relative thereto about a second axis in the other of said planes.

In such an arrangement the lever prefereably carries a first actuating arm connected to one of said speed and stop controls by a linkage including a ball joint whose centre lies on said second axis, and the pivotting block carries a second actuating arm connected to the other of said speed and stop controls by a further linkage including a further ball joint whose centre lies on said first axis.

BRIEF DESCRIPTION OF THE DRAWINGS

An embodiment of the invention will now be described by way of example only with reference to the accompanying drawings in which.

DESCRIPTION OF A PREFERRED EMBODIMENT

Figure 1:
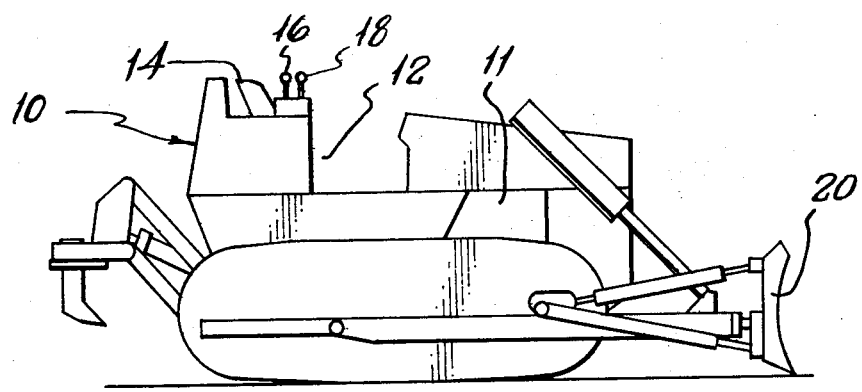
FIG. 1 is a side view of a crawler vehicle.

Referring now to FIG. 1, a crawler vehicle 10 has an engine 11 and an operators station 12 including a seat 14 and a plurality of control levers 16, 18.

The control lever 16 operates a conventional hydraulic valve (not shown) to control movement of the dozer blade 20.

Figure 4:
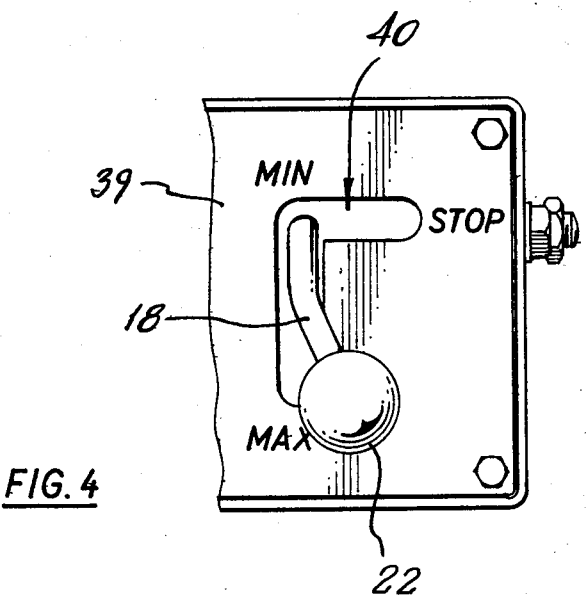
FIG. 4 is a plan view of the lever gate of the control of FIGS. 2 and 3.
Figure 2:
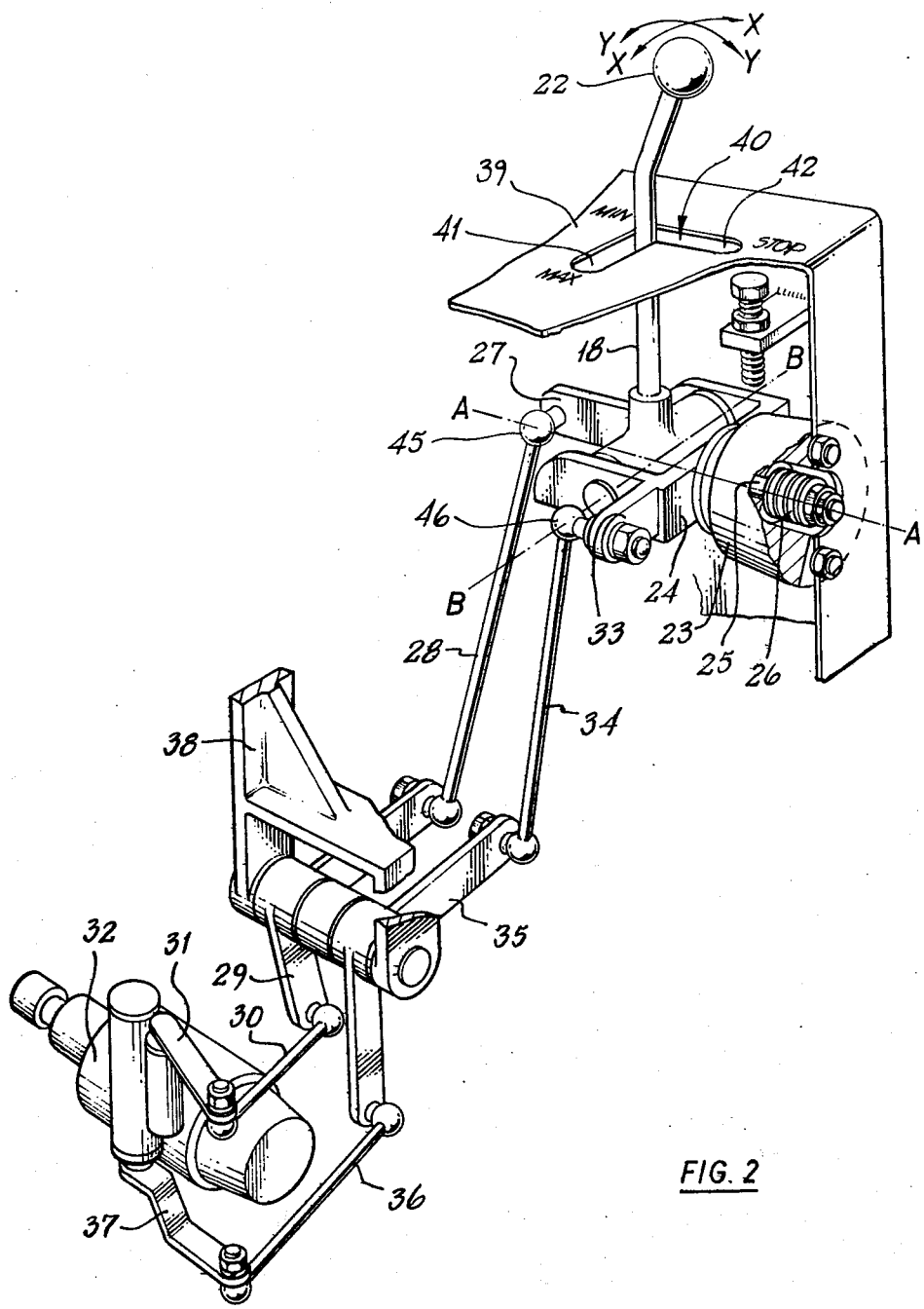
FIG. 2 is a perspective view of a prime mover control used in the vehicle of FIG. 1 and embodying the invention.
Figure 3:
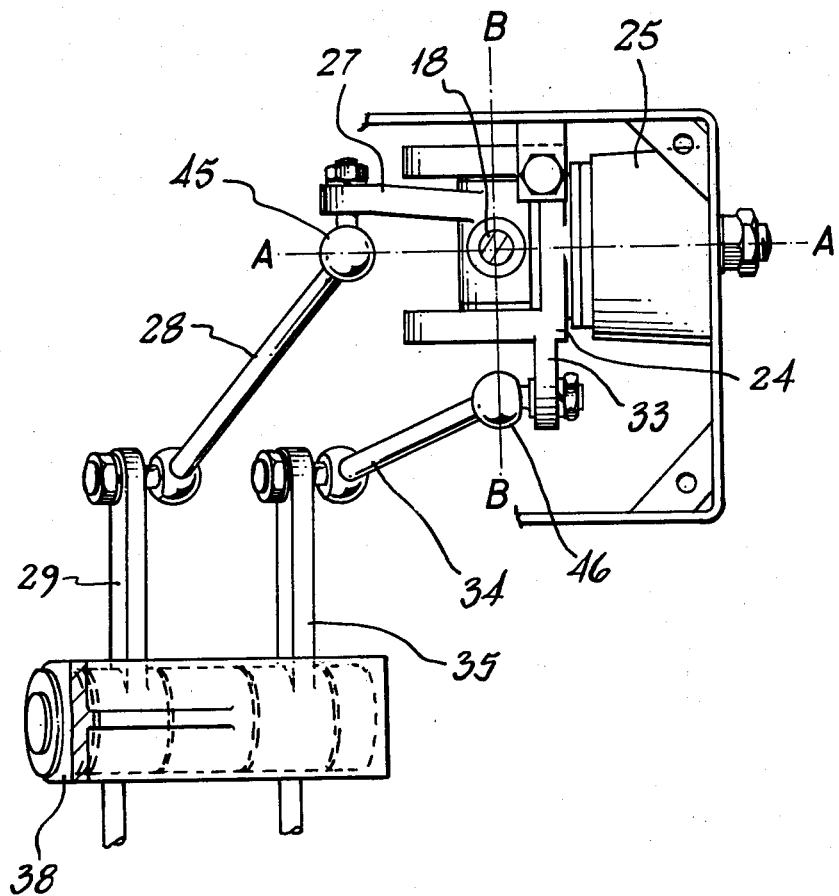
FIG. 3 is a plan view of part of the control of FIG. 2.

The control lever 18 is arranged to regulate the engine 11 as best seen in FIGS. 2, 3 and 4.

The lever 18 has a knob 22 at one end and is supported from a base block 23 by a pivotable block 24. The pivotable block 24 is mounted on the base block 23 by a pin assembly 25, which includes Belleville washers 26, for pivoting relative thereto about an axis A—A in a first plane X—X. The lever 18 is pivotally mounted on the block 24 for pivotting relative thereto about an axis B—B in a second plane Y—Y.

The lever 18 carries an actuating arm 27 which is connected by a ball-joint 45 with a linkage 28, 29, 30, which is connected with a stop control member 31 of a fuel pump 32 mounted on the engine 11. As can best be seen from FIG. 3, the ball joint 45 lies on the axis A—A.

The pivotable block 24 carries an actuating arm 33 which is connected by a ball joint 46 with a linkage 34, 35, 36, which is connected with a speed control 37, of the pump 32. The ball joint 46 lies on the axis B—B.

The lever 18 is guided by a plate 39 having an L-shaped notch 40 having a pair of legs 41, 42.

The operation of the device is as follows. With the lever 18 in the position shown in FIG. 2 the fuel pump 32 is conditional to permit the engine 11 to run at a minimum speed. The engine 11 may thus be started.

Movement of the lever 18 along the leg 41 in the first plane X—X causes the actuating arm 33 to move downwardly to rotate the speed control 37 in a clockwise sense thus increasing the rotational speed of the engine 11. As can be seen from FIGS. 2 and 4 the ends of the leg 41 are designated MIN and MAX respectively indicating the minimum and maximum speed settings respectively.

Since the ball joint 45 lies on the axis A—A about which the lever pivots when moving along the leg 41, no movement of the linkage 28, 29, 30 occurs, so that the stop control 31 is not affected during movement of the lever along the leg 41.

When it is desired to stop the engine 11 the lever 18 is moved along the leg 41 until it is in the minimum speed position shown in FIG. 2 from where it may be moved along the leg 42 to a STOP position. Such movement causes upward movement of the arm 27 which is transmitted through the linkage 28, 29, 30 to rotate the stop control 31 and so stop the engine 11.

It will be appreciated that since the ball joint 46 is on the axis B—B movement of the lever 18 along the leg 42 does not affect the speed control 37.

It will be seen that the operator of the vehicle has a minimum of controls to regulate the prime mover. If desirable the plate 39 may be removed to allow the stop control 31 to be operated at all positions of the speed control 37. In this case the lever 18 may be spring loaded to a running position to prevent unintentional operation of the stop control.

I claim:

1. A prime mover assembly comprising a prime mover and a control therefor, said control having a lever movable in a first plane to vary the rotational speed of said prime mover and movable in a second plane to stop said prime mover, and wherein guide means are provided to guide said lever in said first plane and to permit movement in said second plane only when said lever is in a position corresponding to a minimum rotational speed.

2. An assembly according to claim 1 in which the prime mover is a diesel engine having a fuel pump provided with a speed control and a stop control said lever being connected with said speed and stop controls by separate linkages so that movement of said lever in one of said planes operates said speed control and movement in the other of said planes operates the stop control.

3. An assembly according to claim 1 in which the lever carries a first actuating arm connected to one of said speed and stop controls by a linkage including a ball joint whose centre lies on said further axis, and the pivotting block carries a second actuating arm connected to the other of said speed and stop controls by a further linkage including a further ball joint whose centre lies on said one axis.

* * * * *